May 22, 1928.

O. G. SIMMONS 1,670,906

METHOD OF AND APPARATUS FOR TESTING THE TEETH OF GEARS AND THE LIKE

Filed Oct. 20, 1926    7 Sheets-Sheet 1

INVENTOR:
Oliver G. Simmons

May 22, 1928.

O. G. SIMMONS 1,670,906

METHOD OF AND APPARATUS FOR TESTING THE TEETH OF GEARS AND THE LIKE

Filed Oct. 20, 1926 7 Sheets-Sheet 2

Fig. 2

INVENTOR:
Oscar G. Simmons

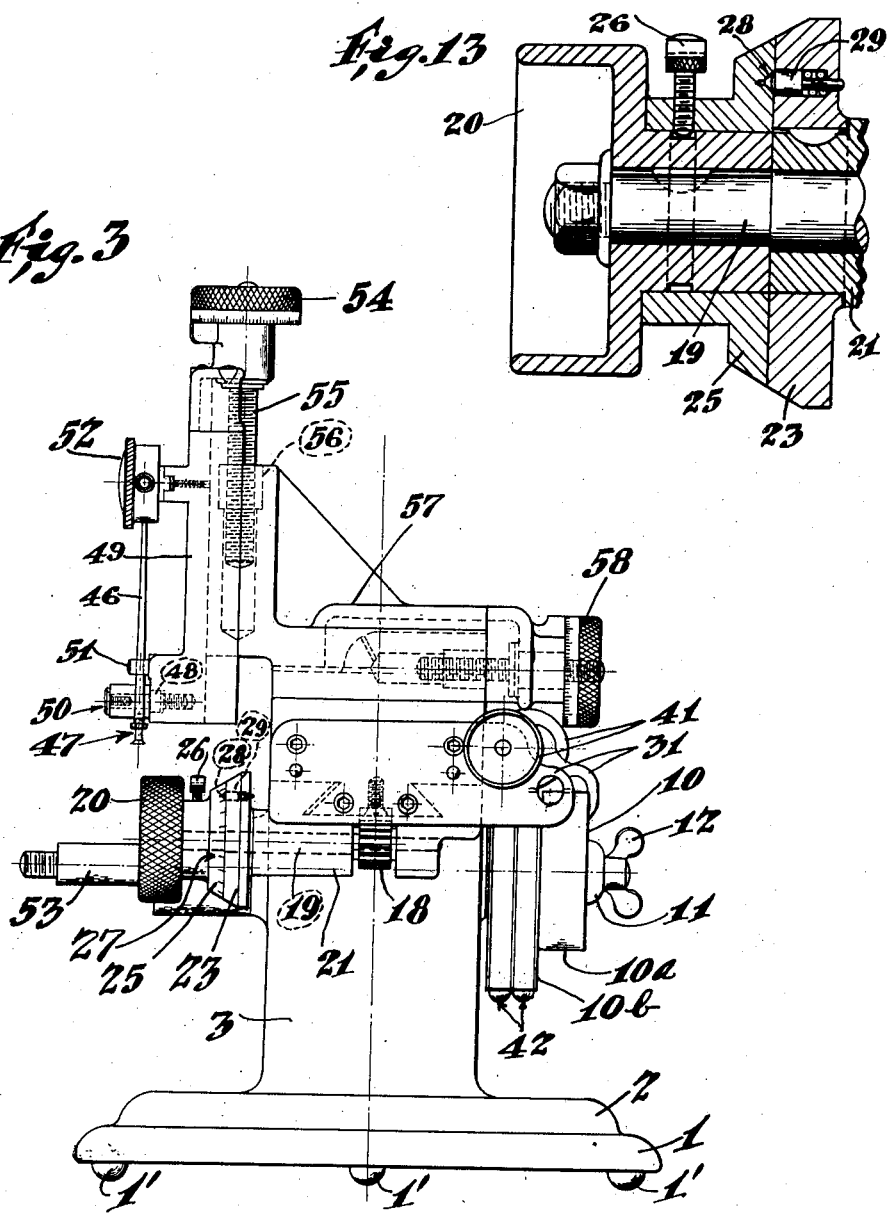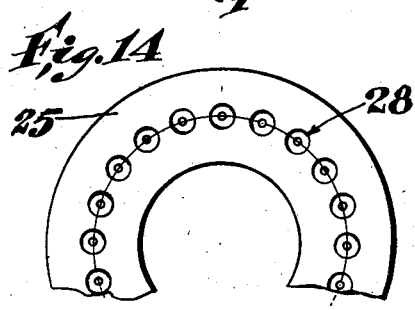

May 22, 1928.
O. G. SIMMONS
1,670,906
METHOD OF AND APPARATUS FOR TESTING THE TEETH OF GEARS AND THE LIKE
Filed Oct. 20, 1926     7 Sheets-Sheet 4
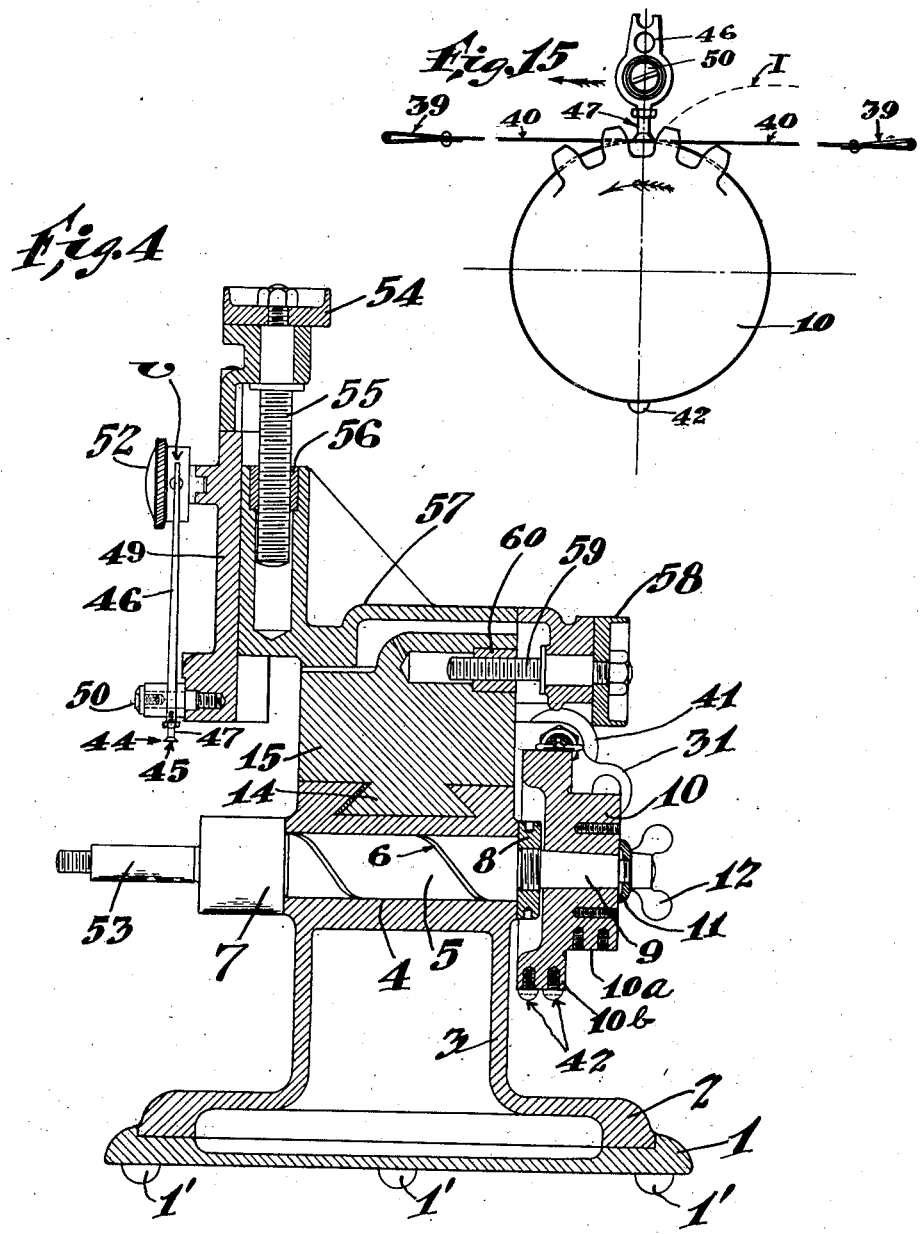

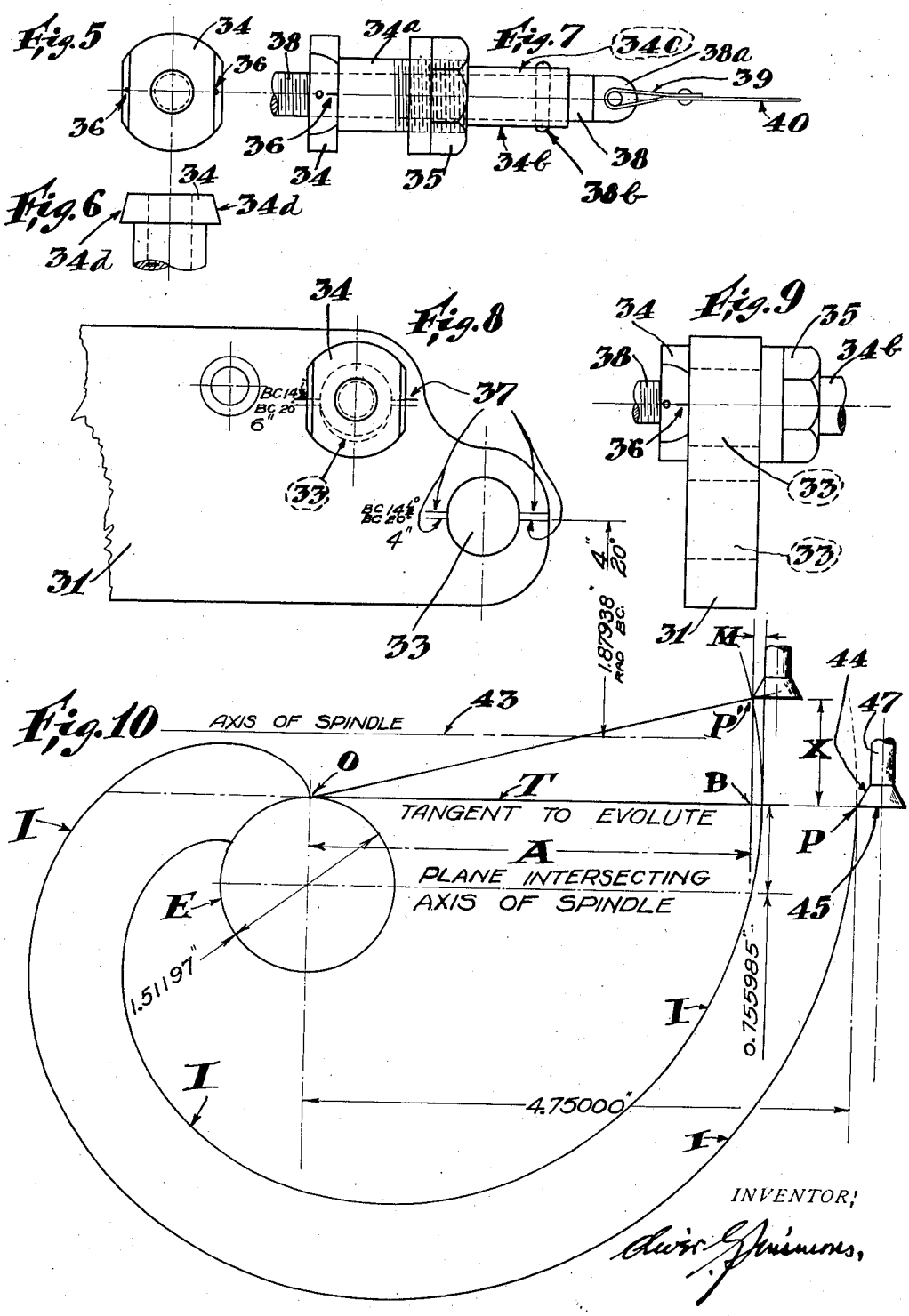

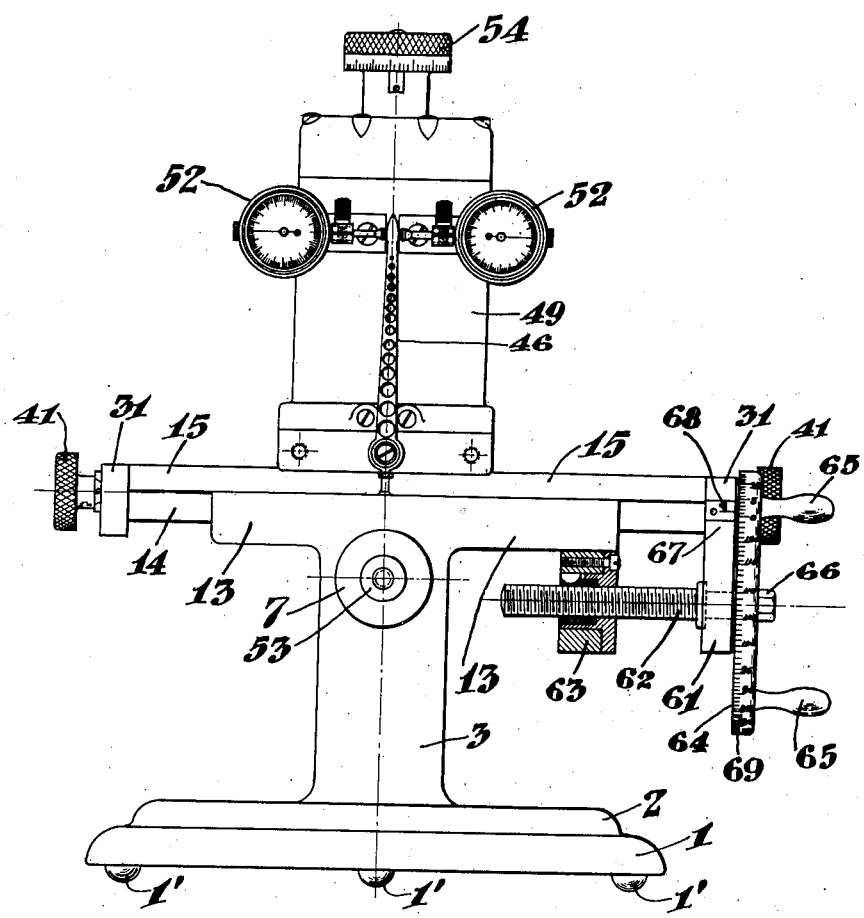

May 22, 1928.

O. G. SIMMONS 1,670,906

METHOD OF AND APPARATUS FOR TESTING THE TEETH OF GEARS AND THE LIKE

Filed Oct. 20, 1926 7 Sheets-Sheet 7

Fig. 12

INVENTOR:
O. G. Simmons,

Patented May 22, 1928.

1,670,906

UNITED STATES PATENT OFFICE.

OLIVER G. SIMMONS, OF LAKEWOOD, OHIO.

METHOD OF AND APPARATUS FOR TESTING THE TEETH OF GEARS AND THE LIKE.

Application filed October 20, 1926. Serial No. 142,866.

My invention relates to improved method of and apparatus for testing surfaces intended to conform to any of the spiral curves which may be generated by a point having a uniform movement angularly around a fixed point and also along a tangent to a circle having its center at said point, i. e., involutes of circles and the epitrochoids thereof. The device of the present invention is designed particularly for testing the teeth of gears and the like in which the gears to be tested are provided with involute curves to a given evolute, a specific circle, all right hand curves of which are parallel and, vice versa, all left hand curves are parallel, so that if a point is moved along a line tangent to and uniform with the rotary movement of said evolute, the point will describe the involute curve to said evolute, and the point will have moved along a tangent line, for each revolution of the evolute, a distance corresponding to the measure of the perimeter of said evolute. This is in accordance with the law of the involute curve which is stated as follows:

The involute of any evolute has a constant lead which, when measured on a line tangent to the evolute, is equal to the perimeter of the generating evolute.

The foregoing being true, the correct definition of such a curve may be given as follows:

The involute curve is the resultant of the uniform movement of a point along a straight line tangent to a given circle and the angular movement of a line about the periphery of a circle uniform with the movement of this point and over an arc equal in length to the distance traversed by this point. This is more fully set forth in the applicant's article, "The law of the involute curve" published in the "American Machinist" issues of November 23rd and November 30th, 1922.

Heretofore in apparatus of this character the method pursued has not provided that the point referred to be placed with precision coincident with the line tangent to the evolute. The necessary mechanism to adjust said point to said tangent line is lacking in all devices and apparatus hereintofore proposed.

The main object of the invention, therefore, resides in the method of and apparatus for setting a theoretical mathematical point, said point being defined as the normal position of the contact point of a deflectable contact member engageable with a surface to be tested, the contact point of said member being preferably a point on the periphery of a circle formed by a plane surface on the contact member intersecting a conical surface thereof at right angles to the axis of the conical surface in a line tangent to the evolute. If the point referred to is not disposed as stated an error will be introduced determined by the difference in the magnitude of the measure of the side adjacent, and the hypothenuse, in a right-angle triangle; the measure of the opposite side of angle; the right-angle triangle being equal to the said right-angle triangle being equal to the measure of the distance the mathematical point is below or above the line tangent to the evolute. If the mathematical point is above or below the line, a minus error will be introduced, the magnitude of the measure of which error will be as referred to above. Said errors in devices heretofore proposed have resulted in much confusion, and when it is uderstood that these errors are usually in units of tens of thousandths of an inch, it is obvious that in the inspection departments of manufacturing establishments, a chaotic condition will result as experienced by the applicant and by manufacturers using the applicant's method of and apparatus to which they work when manufacturing their product, which product, if later checked on devices not provided to operate on the method in the invention herein disclosed, may result in fictitious errors of inspection with the result referred to.

A further object of the invention resides in the means for adjusting the mathematical point previously referred to with respect to evolutes of the involutes under consideration. Another object of the invention resides in the means provided for the adjustment of the point in a plane perpendicular to the axis of the evolute and also in a plane parallel to the axis of the evolute.

A still further object of the invention resides in means to cause the mathematical point to move uniformly along a line tangent to and with the rotary movement of the evolute.

Another object of the invention resides in the means for accurately positioning tape securing means with respect to a line tangent to an evolute. Other objects of the invention reside in the means hereinafter described and referred to in the appended claims.

With the above and still other objects in view the invention comprises broadly the method of and apparatus for measuring the accuracy of involute curves to a given evolute or base circle by determining precisely the measure of the magnitude of error on a true involute curve; and, of measuring the magnitude of the error, if any exist, between parallel involutes generated from the same evolute or base circle, as illustrated in the accompanying drawings hereinafter described and particularly set forth in the appended claims, together with such variation and modification thereof as will be apparent to those skilled in the art to which the invention appertains. Reference should be made to the accompanying drawings forming a part of this specification.

Fig. 2 is a rear elevation of the apparatus shown in Fig. 1.

Fig. 3 is a right end elevation of the apparatus shown in Fig. 1, view being taken from the right hand side of the person viewing the drawing, Fig. 1.

Fig. 4 is a sectional elevation, 4—4 of Fig. 1, looking in the direction of the arrow.

Fig. 5 is an end view of the adjustable tape screw housing member.

Fig. 6 is a fragmentary side view of Fig. 5.

Fig. 7 is a side elevation of the adjustable tape screw housing member, showing fragmentary portion of the tape screw and tape attached thereto in assembly position.

Figure 1:
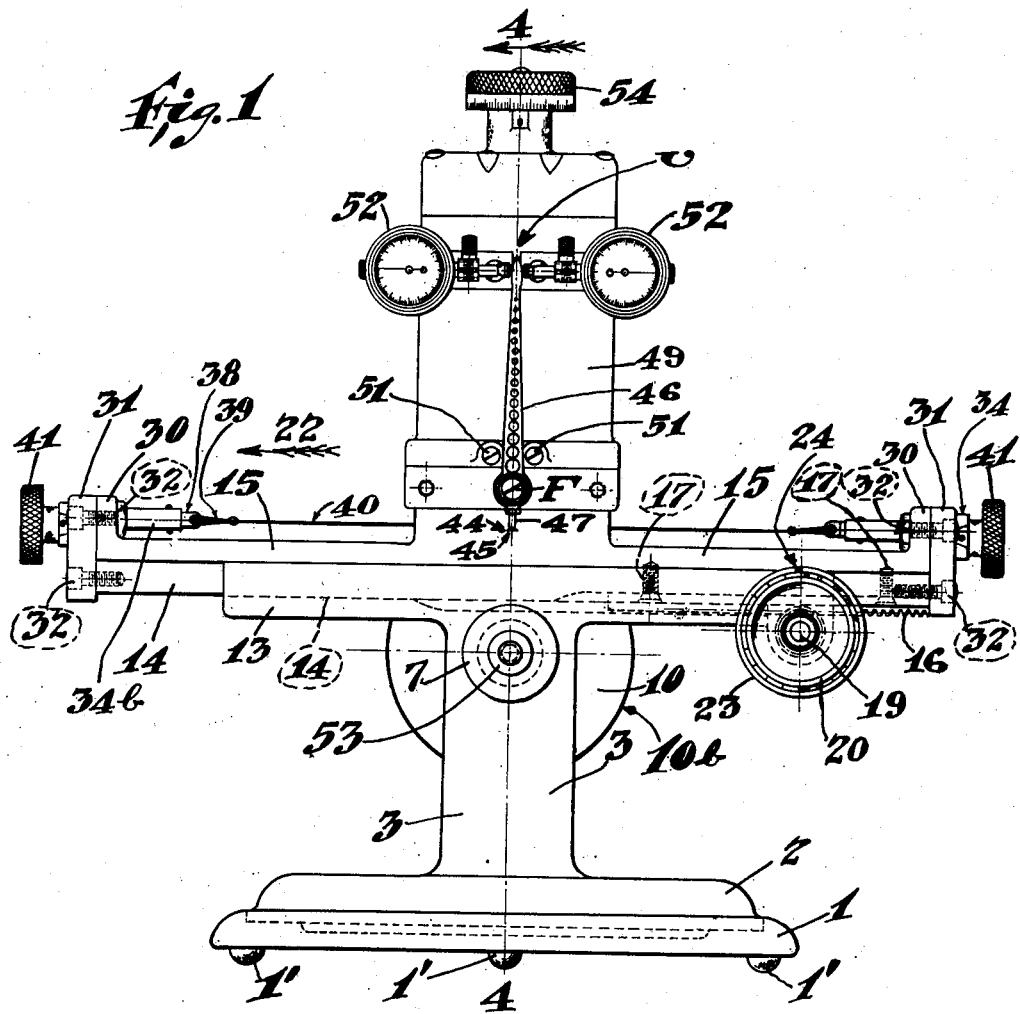
Fig. 1 is a front elevation of the apparatus.

Fig. 8 is a front elevation and partly diagrammatic view of the graduated end plates showing the adjustable tape screw housing as it would be adjusted thereon for a six inch pitch diameter gear or the like, having a base circle determined by a pressure angle of 14½ degrees. The axis of the spindle in this view is shown as a broken line and bears a definite relation to the graduated lines shown as will be later referred to.

Fig. 9 is an end view of Fig. 8.

Fig. 10 is a geometric view illustrating an evolute or base circle with its involute generated thereto from a mathematical point on a line tangent to said evolute.

Fig. 11 is similar to Fig. 1 except in this view a smaller slide member is shown and instead of a rack and pinion and the small hand-wheel to actuate same, as shown in Fig. 1, there is substituted a large dial hand-wheel and screw-threaded connection.

Fig. 12 is an end elevation of Fig. 11 as viewed from the right-hand side of the person viewing the drawing, Fig. 11.

Fig. 13 is a sectional view of a fragmentary portion of the pinion shaft, hand-wheel, graduated dial, zero plate and component parts.

Fig. 14 is a plan view of the dial adapted to rotate with the hand-wheel and illustrates particularly the indentations which are adapted to form a seat for the spring actuated plunger carried by the zero plate.

Fig. 15 is a schematic view illustrating the position of the involute curves of the teeth of gears and the like with respect to the mathematical point.

The numeral 1 indicates the base of the apparatus which, as will be noted, is circular in form and adapted to receive the flange 2 of the bed 3 of the apparatus. The base 1 is provided with the rubber tips 1', adapting it to rest on a table or other suitable appliance. The flange 2 is adapted to be journalled in the base 1 so that the apparatus may be swivelled bodily in base 1 as practice requires. For example, it is decidedly easier to swivel the apparatus in base 1, if for any reason it is desired to present the rear side of the machine, as shown in Fig. 2, to the operator, than it would be to lift it bodily for the purpose aforesaid.

The bed 3 is provided with the bore 4, see Fig. 4, adapting the said bed 3 to have journalled therein the spindle 5. The spindle 5 is provided with oil grooves 6 and enlarged portion 7, forming a shoulder, so that said spindle 5 may be secured against end-play by means of the clamping nut 8 as shown. The spindle 5 is further provided with the tapered portion 9, adapting it to receive the base circle 10, which is provided with one or more steps; as for example, base circle step 10$^a$ and base circle step 10$^b$. The base circle member 10 is fixedly secured to said tapered portion 9 of the spindle shaft 5 by means of the washer 11 and butterfly nut 12. The bed 3 is further provided with the saddle 13, which is provided with V-ways 14, Figs. 1 and 4, adapting it to receive the slide 15 and to be moved laterally in said saddle 13 by means of the track 16 secured to said slide by means of the screws 17, see Fig. 1, and the pinion 18 intermeshing with said rack 16 and fixedly secured to shaft 19 to which is also fixedly secured hand-wheel 20, shaft 19 being journalled in integral bosses 21, forming a portion of the saddle 13. If hand-wheel 20 is rotated, therefore, slide 15 will be caused to move in saddle 13 in the direction of the arrow 22, Fig. 1, or in a direction opposite to that shown by arrow 22, dependent upon the direction of rotation of hand-wheel 20.

The zero plate 23 is fixedly secured to a portion of the boss 21 and is provided with a zero line 24. The dial 25 is journalled on an extended portion of the hand-wheel 20, said dial being provided with the thumb screw 26 so that as hand-wheel 20 is rotated, dial 25 will rotate therewith, dependent upon whether the thumb screw 26 is fixed, to secure and make of dial 25 and hand-wheel 20, a unitary part. The dial 25 is provided with graduations 27 for a purpose to be later described and is further provided with indentations 28 which are adapted to form a seat for the spring-actuated plunger 29, which, as shown, is located in zero plate 23, also for a purpose to be later described.

The slide 15 is provided with end portions 30 and secured thereto are the graduated end plates 31 by means of the fillister head screws 32, see Figs. 1, 2 and 3. The end plates 31, as shown, are provided with elongated slots 33, see Fig. 8, adapting said end plates to receive the tape screw housing 34 and be fixedly secured thereto by means of the washer nut 35 having threaded engagement with the circular threaded portion 34$^a$ of said tape screw housing 34, in a position, preferably predetermined vertical as determined by zero line 36 on said housing 34 and graduated lines 37 on said end plates 31. The housing 34 is provided with the extended portion 34$^b$ which is provided with a slot 34$^c$, said housing 34 being adapted to receive the threaded screw member 38, one end 38$^a$ of which is adapted to receive the loop 39 of the tape 40. The other end of the threaded screw member 38 is adapted to receive the knurled thumb wheel 41. Thread screw member 38 is further provided with the pin 38$^b$, which is fixedly secured thereto, having end portions projecting beyond its outer surface to engage the slot 34$^c$, so that as thumb wheel 31 is rotated the threaded screw 38 will have a longitudinal rectilinear movement only, said pin 38$^b$ preventing any tendency of the threaded screw member 38 from rotating, thus tension is placed on the tapes 40, by the tightening of thumb screw 41 as hereinafter referred to.

The tapes 40, as shown in Fig. 2, are secured at the other end of same by means of a button-head screw 42 to one step of the base circle 10. In Figs. 2 and 4 the tape is shown as fastened to the larger step 10$^b$. It will be observed, with reference to Fig. 2, that tape 40 from the right side of the device substantially semicircles base circle step 10$^b$ on the left side of the base circle 10, whereas tape 40 from the left side of the apparatus substantially semicircles the right side of step 10$^b$ of the base circle 10. The slide 15, through the medium of tapes 40 and the base circle 10 and correlated parts previously described, will cause the spindle 5 to rotate. The rotation of spindle 5, it will be observed, will be in accordance with the diameter of the step 10$^b$. It has been found in practice and can be readily demonstrated that since the tapes 40 are of a given thickness, allowance will have to be made in the diameter of the base circle 10 for the measure of the thickness of the tapes and the actual periphery of the true evolute or base circle lies intermediate the sides of the tape 40. Therefore the measure of the diameter of any evolute or base circle, designed for use in this apparatus, shall be the theoretical evolute or base circle diameter, minus the thickness 40$^a$ of the tapes 40. It follows from the above that the slide 15 will move uniformly with the rotary motion of an evolute or base circle, the effective diameter of which corresponds to the diameter of the evolute or base circle. By "effective diameter" is meant that diameter taken at the median points of the tapes intermediate the sides of same. In other words, the diameter plus the thickness of one tape, or conversely, the theoretical base circle diameter which has been reduced an amount equal to the thickness of the tapes. For example, if the thickness of the tape 40$^a$ is .005 inch and the theoretical base circle diameter is 3.75876 inches, the actual diameter of the base circle 10 will be 3.75876 inches minus .005 inch, but the effective base circle diameter will be the theoretical evolute or base circle diameter of 3.75876 inches.

From the foregoing it will be understood that the thickness 40$^a$ of the tapes must be accurate throughout the length thereof and to a given dimension. This also applies to the actual diameter of the base circle 10, so that the effective diameter as referred to will be correct. It has been found in practice that a variation in the thickness of the tapes of .0001 inch or an equivalent error in the actual diameter of the base circle or evolute 10 will cause an error in the reading of the apparatus of substantially .0003 inch at the outer extremity of the tooth of the gear or the like. For the reason set forth, therefore, it is highly important that the actual thickness of the tape 40$^a$ and the actual diameter of the base circle 10 be held within extremely close limits of error, preferably to within .000025 inch.

From this statement of fact it is obvious that the tapes 40 must be truly disposed tangent to base circle 10 and that the line of tangency must be parallel to path of travel of slide 15. To enable the operator to adjust the tapes parallel to path of travel of slide 15, and to the correct height above the axis 43 of spindle 5, within close limits of error, the end plates 31 are graduated, as shown in Fig. 8. The zero line 36 of the housing is located on each side of the flat portion 34$^d$ of said housing and the lines 37 are accurately located at a given distance above the axis 43 of the spindle 5, the distance, the measure of which corresponds to one-half the theoretical diameter of the evolute or base circle. For example, in a four inch pitch diameter gear or gear shaper cutter having a 20 degree pressure angle, the evolute or base circle diameter would be equal to the cosine of the pressure angle multiplied by the pitch circle diameter. In the example given for a four inch gear or gear shaper cutter, having a twenty degree pressure angle, the base circle diameter will measure 3.75876 and one-half of this will be 1.87938 inches. This, therefore, is the radius of the base circle for a four inch pitch diameter, twenty degree pressure angle gear or gear shaper cutter. For convenience of manipulation by the workmen to suit such requirements; for example, of testing gear shaper cutters which are made commercially in standard pitch diameters of 3, 4, 6, 8 and 12 inches, the apparatus has been constructed in certain size machines to suit the requirements of the trade. The end plates of Fig. 8, therefore, are illustrated in one application of this practice, in which the machine has been adapted to check 4 and 6 inch pitch diameter gear shaper cutters, being graduated for pressure angles most commonly in use; that is to say, pressure angles of fourteen and one-half degrees and twenty degrees.

Referring to Fig. 10 it will be noted that the involute curve I has been generated from the evolute E for a distance of one spire or one revolution of the evolute E. In the single revolution referred to, and in accordance with the law of the involute, the generating point, as for example, P, will have moved from position O along a line T tangent to the evolute to the position P as shown. The measure of the distance from O to position P will equal, as previously stated, the perimeter of the evolute E; in the specific example illustrated by Fig. 10, this is found to be 4.75000 inches. In this geometric view the plane intersecting axis of spindle is shown extended by dot and dash line projection to the right of the evolute in the plane of the drawing and the measure of the distance between the axis of the spindle and the tangent line T, is one-half the diameter of the evolute or equal to .755985 inch. The point P, therefore, must at all times lie in the line T, a line tangent to the evolute.

The point P has been previously defined as a point on the intersection of a plane intersecting a cone transversely thereof. It is obvious that the point P in a plane intersecting the cone must lie in the line T, which is the line tangent to the evolute, and if it be assumed that the plane referred to passes through the line tangent to said evolute, but through accident, wear of needle point, or otherwise, the point P' is moved a distance X above the line T tangent to evolute, it is obvious that an error having a magnitude which will equal the measure M has been introduced and this error it is seen is the difference between the length of the adjacent side A and the length of side OP' in the right-angle triangle OBP'. The apparatus therefore would show a minus reading error dependent upon the magnitude of the measure M and conversely, if the point P' was below the tangent line T, the distance X, the magnitude of the error M would be in the same order in that the error would be minus.

In the apparatus forming this invention means have preferably been provided to adjust point P, and the point P has preferably been provided for in the practical application as being in the intersection of the conical surface 44 and the plane surface 45, so that the line of intersection can be maintained, as for example by grinding conical surface 44.

It is important in an apparatus of this character that the magnitude of the error be magnified as much as possible consistent with good practice. For this purpose, therefore, there is preferably provided the amplifying lever arm 46, see Figs. 1, 3, 4, 11 and 12, provided with the needle point 47, lower extremity of which is provided with the conical surface 44, and the plane surface 45, previously referred to and shown enlarged in Fig. 10. This amplifying lever arm 46 is pivoted at F, being journalled on the stud 48, which is fixedly secured at one end thereof to the vertical slide 49, said amplifying lever arm 46 being journalled on the other end of said stud 48 and secured against displacement therefrom by means of the flat-head screw 50. The amplifying lever arm 46, therefore, may be oscillated a slight amount each side of the center sectional line 4—4, Fig. 1. To prevent excessive movement of this amplifying lever arm, studs 51 are provided on each side thereof to arrest its movement. To the upper portion of slide 49, dial indicators 52 are secured by any suitable means, one on each side of the amplifying lever arm 46, and adjusted in such position so that when the point v of the amplifying lever arm 46 coincides with the vertical center sectional line 4—4, the pointing needle in each indicator will register zero.

Referring to Fig. 4, the spindle 5 is further provided with the extension 53, on which there is adapted to be secured, by any suitable means, a circular disc, not shown, the diameter of which corresponds to the theoretical evolute or base circle diameter. The slide 49 is adapted to be moved up or down by means of the handwheel 54 and screw 55, having threaded engagement with the nut 56, said nut being secured to traverse slide 57. In setting the needle point 47 the correct height above the axis 43 of the spindle 5, it is only necessary to place the aforesaid disc of proper diameter on the extension 53, of the spindle 5, and raise or lower the slide 49 until the surface 45 of the needle point 47 contacts therewith, after which the slide 49 may be locked in said position by any suitable means, as for example, in the ordinary way of tightening gib screws. The traverse slide 57 is adapted to be moved transversely of the slide 15, by means of the hand-wheel 58 being secured to screw 59, which has threaded engagement with nut 60 fixedly secured to said slide 15. The vertical slide 49 and the traverse slide 57, therefore, provide means to adjust needle point 47 vertically or longitudinally of the axis 43 of the spindle 5. This adjustment is made for the reasons heretofore stated and for the additional reason of adaptability by which an embodiment of the apparatus in a machine is given a range, enabling a given machine to test the involute curves of gears and the like of various sizes within its capacity.

The schematic view of Fig. 15 clearly illustrates the position of the involute curved surface of the tooth and fragmentary portion of the amplifying lever arm 46, needle point 47 and mathematical point 44 in contact as described.

The apparatus shown in Figs. 11 and 12 is identical with that just described, except for slide modification and structural difference in the means provided to cause the slide 15 to move in the saddle 13.

Referring to Fig. 12 it will be noted that the end plate 31 on the right hand side of the machine is provided with the extension 61 in which is journalled the screw 62. This screw has threaded engagement with the nut 63, said nut being fixedly secured to saddle 13. Screw 62 is provided, as shown, with the large hand-wheel 64 having handles 65. Hand-wheel 64 may be fixedly secured to said screw 62 by any suitable means, as for example by a woodruff key and nut 66 having threaded engagement with end portion of the screw 62. End plate 31 is further provided with the extension 67, on the outer portion of which the zero line 68 has been engraved. The hand-wheel 64 is provided with the graduation 69 shown, so that as hand-wheel 64 is rotated from one graduation point 69 to the other, with reference to zero line 68, slide 15 will be caused to move .001 inch.

It will be apparent that each tooth face of a gear is a cam surface and that the device of the present invention is adapted to be used for testing any cam surface intended to conform to a uniform lead spiral curve of the class which includes the involutes of circles. If the tracing point P be adjusted above or below the tangent to the base circle member, the point P, if undeflected, will trace a prolate or curtate epitrochoid of the involute of the base circle, the prolate epitrochoid having a base circle larger than the involute and a uniform lead along a tangent to its base circle less than that of the involute of its base circle and the curtate epitrochoid having a smaller base circle and a lead along a tangent to its base circle greater than the involute of its base circle. Such an adjustment of the tracing point may be employed in testing helical gears of the type produced by the method disclosed in my co-pending application Serial No. 178,021, filed Mar. 24, 1927, for method of cutting helical gear teeth, which are of epitrochoidal form in planes perpendicular to their axes.

The apparatus described has been found to be very sensitive and smooth in operation and in practice incident to scientific laboratory work has enabled physicists and others to minutely investigate tooth contour and the rolling action of involute gears.

Having thus described my invention I claim:

1. The herein described method of testing curved surfaces which consists in accurately positioning in a line tangent to a given base circle, a theoretical mathematical point which is represented by the normal position of the actual contact point of a deflectable contact member engageable with the surface to be tested, and imparting to the surface and contact member rotational and linear movements, about the axis of the base circle and along said tangent line, so correlated as to cause said theoretical point to trace the theoretical curve and said actual contact point to be deflected by portions of said surface which do not conform to said theoretical curve.

2. The herein described method of testing involute surfaces which consists in accurately positioning in a line tangent to the evolute, a theoretical mathematical point which is represented by the normal position of the actual contact point of a deflectable contact member engageable with the surface to be tested, and imparting to the surface and contact member rotational and linear movements, about the axis of the evolute and along said tangent line, so correlated as to cause said theoretical point to trace the theoretical curve and said actual contact point to be deflected by portions of said surface which do not conform to said theoretical curve, and indicating the magnitude of the deflection of the contact member during the passage of said contact point over said surface.

3. In gear testing apparatus, a contact member having a tooth engaging portion formed by a conical face and a plane face transverse to the axis of the cone and intersecting the conical surface at an acute angle to provide an edge for point contact with a gear tooth.

4. In gear testing apparatus, a contact member having a flat end face and a conical surface flaring toward said end face and having its axis perpendicular to said end face, the intersecting conical and plane surfaces providing an edge for point contact with a gear tooth.

5. In apparatus of the character set forth, a work spindle, a supporting member mounted for linear movement laterally of the spindle, a contact member yieldably mounted on said member and having a contact point which normally occupies a fixed position with respect to said member, means for turning said spindle and for imparting a correlated linear movement to said supporting member laterally of the spindle, means for indicating deflections of the contact member from normal position, and means for adjusting said contact member toward and from the axis of the spindle.

6. In apparatus of the character set forth, a work spindle, a supporting member mounted for linear movement laterally of the spindle, a contact member yieldably mounted on said member and having a contact point which normally occupies a fixed position with respect to said member, means for turning said spindle and for imparting a correlated linear movement to said supporting member laterally of the spindle, means for indicating deflections of the contact member from normal position, means for adjusting said contact member toward and from the axis of the spindle, and means for adjusting the contact member longitudinally of said spindle.

7. In an apparatus of the character set forth, a spindle adapted to receive a gear to be tested, a slide mounted to move transversely of the axis of said spindle, means for imparting a turning movement to the spindle and for moving a slide uniformly with the rotary motion of the theoretical base circle of the gear on the spindle, a contact member yieldably mounted in the slide and having a contact point, the normal position of which represents a mathematical point which moves with the slide, and means to adjust the contact member to position said mathematical point in a line tangent to said theoretical base circle.

8. In apparatus of the character set forth, a spindle journaled in the base, a vertical slide mounted on the first mentioned slide, an amplifying lever mounted on the vertical slide, said amplifying lever having a contact point, the normal position of which represents a mathematical point fixed with respect to the first mentioned slide and means for imparting movement to the first mentioned slide and rotary movement to the spindle which is uniform with respect to the movement of the slide, and a plurality of dial indicators actuated by said amplifying lever.

9. In apparatus of the character set forth, a spindle journaled in the base, a member having a base circle mounted in said spindle, a slide adapted to move on said base laterally of the spindle, a vertically adjustable amplifying lever mounted on said slide, said lever having a contact point, the normal position of which represents a mathematical point fixed with respect to said slide, means connecting the base circle member and slide to move the slide uniformly with the rotary movement of the base circle member and means for adjusting said amplifying lever along a line parallel to the axis of the spindle.

10. In an apparatus of the character set forth, a spindle journaled in the base, a slide mounted to move on said base laterally of the spindle, a vertical slide mounted on the first mentioned slide, means for adjusting said vertical slide, means connecting the first mentioned slide with said base circle member for causing said slide to move uniformly with the rotary movement of said member, an amplifying lever carried by said vertical slide, said amplifying lever having a contact point, the normal position of which represents a mathematical point fixed with respect to said first mentioned slide and a plurality of dial indicators actuated by said amplifying lever.

11. In an apparatus of the character described, a spindle journaled in the base, a slide mounted on said base for movement laterally of the spindle, means connecting said spindle and slide for causing the slide to move at a velocity equal to the velocity of a point on a theoretical base circle concentric to the spindle and turning therewith, an amplifying lever carried by the slide and having a contact point, the normal position of which represents a mathematical point fixed with respect to the slide, means for adjusting the amplifying lever toward and from the spindle to position said mathematical point in a tangent of the theoretical base circle which is parallel to the direction of movement to the slide, and a dial indicator actuated by said amplifying lever.

12. In an apparatus of the character set forth, a base, a spindle journalled in said base, a member having a base circle mounted on said spindle, a slide carried by said base and adapted to move in a rectilinear path transversely of the axis of said spindle, tapes secured at one end thereof to said base circle, and means for fixedly securing the other ends of said tapes in adjusted position to accommodate said base circle, so that said tapes will lie in a plane tangent to said base circle, said plane being parallel to the path of movement of said slide.

13. In an apparatus of the character set forth, a base, a flange journalled therein, a saddle and bed integral with said flange, a spindle carried by the bed, a slide carried by said saddle, said slide carrying a horizontal slide and a vertical slide, said vertical slide being provided with an amplifying lever arm and a plurality of dial indicators, a needle point carried by said amplifying lever arm adapted to be positioned with respect to the axis of said spindle along a vertical line and also along a line at right angles thereto, a member having a base circle mounted on said spindle, said spindle being further adapted to receive the work, connecting means between said spindle and slide carried by the saddle, so that as said slide is moved in a rectilinear path the spindle is caused to rotate.

14. In an apparatus of the character set forth, a bed, a saddle mounted on the bed, a shaft carried by the saddle, a slide carried by the saddle, a rack secured to said slide and an intermeshing pinion fixedly secured to said shaft, a hand-wheel fixedly secured to said pinion shaft, a zero plate fixedly secured to said saddle, a graduated dial mounted on said hand-wheel, a spring actuated plunger journalled in said zero plate and adapted to engage indentations in said dial for the purpose set forth.

15. In an apparatus of the character set forth, a bed, a saddle integral therewith, a shaft carried by the saddle, a slide carried by said saddle and means to move said slide with respect to said saddle, said means comprising a rack fixedly secured to said slide, an intermeshing pinion fixed on said shaft, and a hand-wheel fixedly secured to said shaft for the purpose set forth.

16. In an apparatus of the character set forth, a bed, a saddle integral therewith, a slide carried by said saddle and means to move said slide with respect to said saddle, said means comprising an end plate fixedly secured to said slide provided with two extensions, a screw journalled on one of said extensions, said screw being provided with a graduated dial, the other extension being provided with a zero line to coincide with the periphery of said graduated dial, a nut fixedly secured to said saddle and having threaded engagement with said screw, so that said slide may be moved with respect to said saddle, the measure of which is determined by the unit of measure of the graduations on said dial.

Signed this 19th day of October, 1926.

OLIVER G. SIMMONS.